United States Patent [19]

Kuneman et al.

[11] 3,804,064

[45] Apr. 16, 1974

[54] AMPHIBIAN TERRARIUM FOR USE WITH AQUARIUMS

[75] Inventors: William A. Kuneman, Milpitas; Joe N. Sunseri, San Jose, both of Calif.

[73] Assignee: Aqua-Sun, Incorporated, San Jose, Calif.

[22] Filed: Nov. 16, 1972

[21] Appl. No.: 307,007

[52] U.S. Cl. ................................................ 119/5
[51] Int. Cl. ............................................ A01k 63/00
[58] Field of Search ...................... 119/3, 5, 17, 19

[56] References Cited
UNITED STATES PATENTS

| | | | |
|---|---|---|---|
| 3,699,921 | 10/1972 | Janicek | 119/5 |
| 3,141,442 | 7/1964 | Harris | 119/5 |
| 3,091,220 | 5/1963 | Willinger et al. | 119/5 |
| 3,327,686 | 6/1967 | Holder | 119/5 |

*Primary Examiner*—Russell R. Kinsey
*Assistant Examiner*—J. N. Eskovitz
*Attorney, Agent, or Firm*—Moore, Zimmerman & Dubb

[57] ABSTRACT

The invention is concerned with an amphibian terrarium for use with an aquarium which allows an amphibian, such as a turtle, to spend a substantial portion of his time in an aquarium in a water environment with tropical fish, plants and the like and which further provides a fixed ramp whereby the amphibian can climb out of the water and onto a dry simulated land area which allows the amphibian to spend the remainder of his time in an earth environment with sand, dirt and plants. An important feature of the present invention is the use of a ramp, one end of which extends from the simulated land area downwardly to beneath the water level in the aquarium to allow an amphibian to readily swim onto its lower ledge so that he may climb up the ramp to the dry simulated land area, the ramp having a moderate angle of inclination and good traction characteristics.

6 Claims, 3 Drawing Figures

AMPHIBIAN TERRARIUM FOR USE WITH AQUARIUMS

BACKGROUND OF THE INVENTION

The invention is concerned with providing a balanced ecological system for amphibians which allows amphibians to live in both a water environment and an earth environment and specifically relates to a terrarium for use with an aquarium and having a fixed ramp for communication therebetween.

Amphibians such as turtles and salamanders are generally kept by the hobbiest in relatively shallow aquariums. Such shallow aquariums usually contain rocks or the like onto which the amphibians can climb up onto a dry area. For the ingestion of air and for exercise, it is necessary that amphibians be provided with both in-water and out-of-water facilities. In the prior art shallow aquariums, the amphibians generally cannot get enough in-water exercise since these aquariums are normally shallow and since the rocks usually placed in these aquariums generally take up a good deal of the space therein. Further, when the amphibian is atop the rock, it can generally not get a good deal of exercise because of the limited surface area of the rock. Also, unless a close, warm environment is provided, the amphibian may become chilled as he is drying off and may die from exposure.

When amphibians are kept in deep water aquariums, for example, aquariums 8 to 12 inches or more in depth, the amphibians generally cannot get any out-of-water exercise unless the hobbiest removes them and places them on a dry area. Thus, the muscles that the amphibians should develop by out-of-water exercise do not develop to the fullest extent. Nor are amphibians exposed to the open air.

Attempts have been made to provide amphibians a means of surviving in deep water aquariums. These have involved floating objects, e.g. styrofoam sheets, on the surface of the water in the aquarium to allow amphibians to cling to the edges and stick their head into the open air. In U.S. Pat. No. 3,141,442, issued to Harris, a floating raft is disclosed to have a series of steps to allow a turtle to get completely out of the water. The use of a floating object has provided a means to reach the open air but has not created a balanced ecological system. Nor having floating devices been entirely satisfactory in operation since anything that floats can sink, especially if an oversized amphibian or a large number of amphibians climb onto the device. Also, a floating object is inherently unstable and will tilt to one side if the weight of an amphibian is not evenly distributed. The use of guide legs as disclosed in the '442 patent enhances stability but does not insure it as the raft may still jiggle as the turtle moves thus making it difficult for a turtle to climb onto the raft. Furthermore, a raft may hang up on guide legs and strand the turtle on the raft or keep it from reaching the raft if the water level in the aquarium is lowered. Since most fully equipped aquariums are provided with lights above the water, the use of a floating platform for amphibians may adversely affect the health of the amphibians as they may be too close to the light so that amphibians get too hot. Also, amphibians resting or clinging to floating objects are often obscured from general view as they are nearly level with the upper rim of the aquarium and close to the light enclosure.

As a result of the problems set out above, amphibians often do not live as long as might be desired by the hobbiest.

Accordingly, it is an object of the present invention to provide a terrarium for use with an aquarium which allows an amphibian to readily move between a water environment and an earth environment.

It is a further object of the invention to provide a device wherein amphibians can get more complete and balanced in-water and out-of-water exercise.

It is a still further object of the invention to provide a device which will tend to lengthen the life span of pet amphibians.

Further, it is highly desirable especially as a teaching tool for children, to demonstrate a completely or nearly completely balanced ecological system. Thus, the provision of a combination aquarium-terrarium wherein amphibians can move about both in-water and out-of-water is a desired goal.

Still another object of this invention is to provide a device which permits an amphibian in an aquarium to readily reach the open air and feed, mate and breathe in a natural environment.

These and other objects of the invention which will become apparent from the description which follows are attained as set out herein.

SUMMARY OF THE INVENTION

The invention comprises a terrarium for use with an aquarium which allows an amphibian to readily move between a water environment and an earth environment. The terrarium comprises a generally planar member configured to fit atop an aquarium, the generally planar member having an opening passing therethrough of sufficient size to permit the passage of the amphibian. A ramp is attached at its upper end to the generally planar member and descends through the opening sufficiently far below the generally planar member so that its lower end extends into the water in the aquarium. The upper surface of the ramp is textured to provide good traction for the amphibian as it climbs up or moves down the ramp.

BRIEF DESCRIPTION OF THE DRAWING

For a more complete understanding of the terrarium of the present invention reference may be had to the accompanying drawing which is hereby incorporated by reference and in which.

DESCRIPTION OF THE PREFERRED EMBODIMENT

Figure 1:
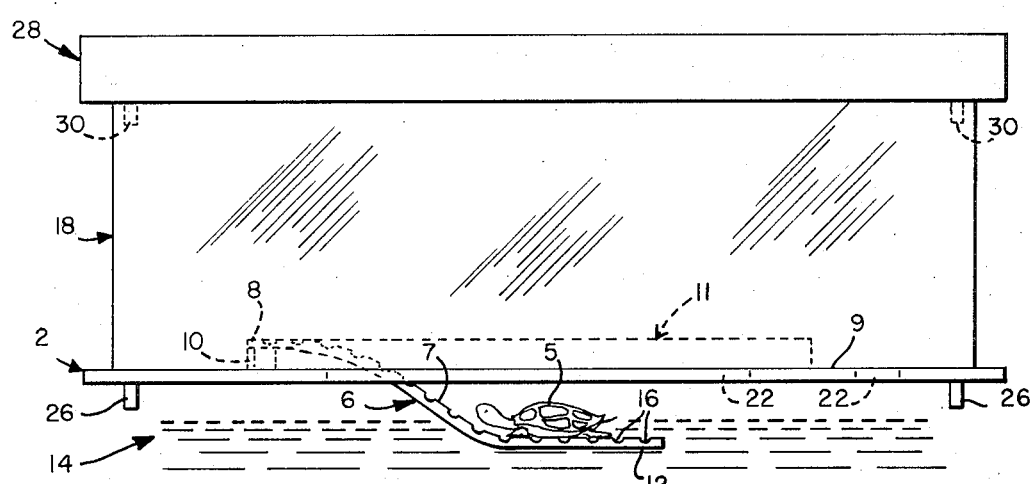
FIG. 1 is a side view of the device of the present invention with a light source positioned atop the device.
Figure 2:
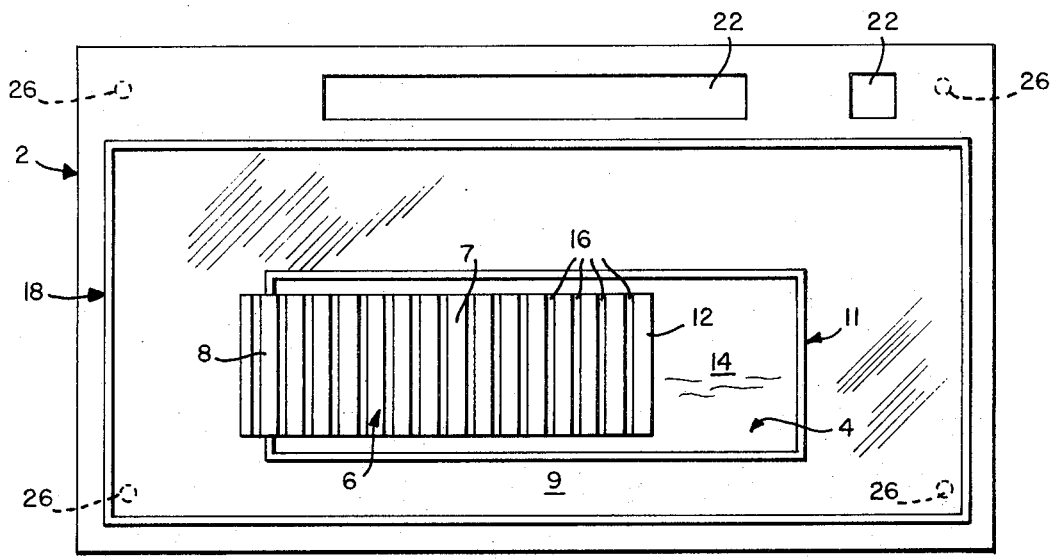
FIG. 2 illustrates the preferred device of the present invention in top view.
Figure 3:
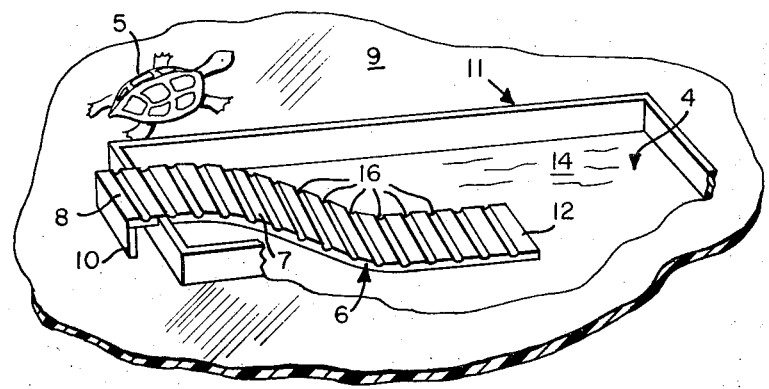
FIG. 3 is a partial perspective view of the ramp portion of the device of the present invention.

Referring now to the FIGURES, a generally planar member 2 is illustrated as having an opening 4 passing therethrough. The opening 4 must be of sufficient size to permit the passage of an amphibian. An amphibian, such as the turtle 5, may swim onto lower end 12 of ramp 6 and climb upwardly along upper surface 7 which is textured to provide good traction for the turtle 5. The upper end 8 of the ramp 6 is the point of entry or exit of the turtle 5 from the top 9 of the planar member 2. The ramp 6 is supported, in the embodiment shown, at its upper end 8 by a support 10. Additional support may also be provided by one side of the barrier 11 which surrounds the opening 4. The lower end 12 of the ramp 6 is sufficiently below the surface of the water 14 in the aquarium so that the turtle 5 can swim onto the top of the lower end 12 of the ramp 6.

The ramp 6, on its upper side 7, as stated above is textured to provide good traction for the turtle 5. As is illustrated in the FIGURES, the traction is preferably provided by a plurality of substantially parallel grooves 16 configured in the upper surface of the ramp 6, the grooves 16 being aligned substantially perpendicular to the ascending or descending direction of travel of the turtle 5. Grooves 16 are preferable to protruding steps since the growth of algae renders steps slippery while the sides of grooves 16 always permit traction.

The device of the invention includes a wall 18 attached to the planar member 2 adjacent the periphery thereof and completely surrounding opening 4, the wall 18 being sufficiently high to prevent the turtle 5 from escaping from the planar surface. A barrier 11 which is attached to the planar member 2 surrounds and is adjacent to the opening 4, the barrier 11 serving to discourage the turtle 5 from entering the water 14 other than via the ramp 6. The surface 9 of generally planar member 8 serves as the base of a terrarium. Sand, gravel, dirt, rocks, plants and feeder dishes may be placed on surface 9. Thus, it is evident that barrier 11 and wall 18 also serve as sides to enclose the terrarium. The simulated earth environment created on surface 9 should approximate as far as possible the natural habitat of the amphibian. One of the requirements of such a natural habitat is that it be warm and moist, e.g. tropical. The presence of the water in the aquarium provides a high humidity while the light source above the terrarium, as shown in FIG. 1, provides heat. The water itself is suitable as virtually all tropical fish tanks are heated.

In the preferred embodiment shown the planar member 2 includes, outside the perimeter of wall 18, at least one hole 22 therein, the holes 22 being useful for insertion of equipment to control conditions, e.g., temperature, water cleanliness and the like, within the aquarium. Also, the planar member 2 further includes, attached to the bottom thereof a means for maintaining the planar member in position atop an aquarium. The particular position maintenance means shown are a plurality of posts 26 attached to the bottom of the planar member 2 at four corners of an imaginary rectangle the size of the inner dimensions of the aquarium. In use, each of the posts 26 would fit within one of the four corners of an aquarium of a particular size.

In FIG. 1 only there is illustrated an aquarium light source 28 which may be placed above and on top of the wall 18. Legs 30 attached to the bottom of the aquarium light source can be provided to hold the light source in place on top of the wall 18 in the same manner that legs 26 hold the terrarium on top of the aquarium. Generally a fluorescent light source should be used. The use of a light source is particularly desirable in order to keep the amphibians warm and in order to provide a suitable environment for the plants. The preferred material of construction of the device of the present invention is a clear plastic such as polymethylmethacrylate or the like. A material such as polymethylmethacrylate is particularly desirable since it is strong, rigid, and transparent. If polymethylmethacrylate or a similar clean plastic is used, the light source 28 must use fluorescent lights to prevent damage to the plastic.

In use, the device of the present invention is simply placed atop an aquarium, the aquarium having sufficient water in it so that the bottom of the ramp 6 is below the surface of the water 14. As pointed out previously that portion of the device of the present invention above the planar member 2 is preferably filled with soil and used as a terrarium to provide a balanced ecological system. The aquarium over which the device for the present invention is placed can have quite deep water thereby giving good in-water exercise to an amphibian and the area atop the planar member 2 can be quite large thus providing exposure to the open air in a natural earth environment in which an amphibian can obtain significant out-of-water exercise.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A terrarium for use with an aquarium which allows an amphibian to readily move between a water environment and an earth environment, comprising:

a planar member adapted to fit on top of said aquarium, said planar member having an opening passing therethrough of sufficient size to permit the passage of said amphibian through said opening;

a ramp attached at its upper end to said planar member, said ramp descending through said opening sufficiently far below said planar member so that the lower end of said ramp terminates below the water level in said aquarium, the upper surface of said ramp being textured to provide good traction for said amphibian as it climbs up or moves down said ramp;

a wall attached to said planar member around the periphery thereof, said wall completely surrounding said opening, said wall being sufficiently high to prevent said amphibian from escaping from said planar surface; and a barrier attached to said planar member removed from said wall and surrounding and adjacent to said opening, said barrier serving to discourage said amphibian from entering the water other than via said ramp and to retain sand, soil, or gravel which may be placed on said planar member.

2. A terrarium as in claim 1, further characterized in that said ramp has a plurality of substantially parallel grooves on the upper surface thereof, said grooves being aligned substantially perpendicular to the direction of travel of said amphibian up or down said ramp to provide said good traction.

3. A terrarium as in claim 2 wherein said ramp is attached to said planar member by means of a support fitted between said planar member and an upper end of said ramp.

4. A terrarium as in claim 3, wherein said planar member includes, attached to the bottom thereof, a means for holding said planar member in position atop said aquarium.

5. A terrarium as in claim 4, wherein said planar member includes an extension beyond the area encompassed by said wall, said extension having at least one hole therein, said hole being useful for insertion of equipment to control conditions within said aquarium.

6. A combination, comprising the device of claim 5 and an aquarium light source, said aquarium light source being adapted for fitting atop said wall and including, attached to the bottom of said aquarium light source, a means for positioning said aquarium light source atop said wall.

* * * * *